United States Patent
Grübel et al.

(10) Patent No.: US 10,333,366 B2
(45) Date of Patent: Jun. 25, 2019

(54) EXPANDABLE SLOT CLOSURE FOR AN ELECTRIC MACHINE

(71) Applicant: SIEMENS AKTIENGESELLSCHAFT, München (DE)

(72) Inventors: André Grübel, Fürth (DE); Dieter Schirm, Breitengüssbach (DE)

(73) Assignee: Siemens Aktiengesellschaft, Müunchen (DE)

( * ) Notice: Subject to any disclaimer, the term of this patent is extended or adjusted under 35 U.S.C. 154(b) by 0 days.

(21) Appl. No.: 15/561,423

(22) PCT Filed: Feb. 9, 2016

(86) PCT No.: PCT/EP2016/052670
§ 371 (c)(1),
(2) Date: Sep. 25, 2017

(87) PCT Pub. No.: WO2016/150610
PCT Pub. Date: Sep. 29, 2016

(65) Prior Publication Data
US 2018/0062474 A1    Mar. 1, 2018

(30) Foreign Application Priority Data
Mar. 26, 2015 (EP) ..................... 15161108

(51) Int. Cl.
*H02K 3/493* (2006.01)
*H02K 15/00* (2006.01)

(52) U.S. Cl.
CPC ......... *H02K 3/493* (2013.01); *H02K 15/0018* (2013.01)

(58) Field of Classification Search
CPC .... H02K 3/493; H02K 3/487; H02K 15/0018; H02K 15/0031; H02K 15/12; H02K 15/125
(Continued)

(56) References Cited

U.S. PATENT DOCUMENTS

| 1,375,699 A | * | 4/1921 | Max ...................... H02K 3/493 310/214 |
| 2007/0075604 A1 | | 4/2007 | Hsu |

(Continued)

FOREIGN PATENT DOCUMENTS

| CN | 2094820 U | 1/1992 |
| CN | 1829049 A | 9/2006 |

(Continued)

OTHER PUBLICATIONS

Partial machine translation of JP 55029242 A (Mar. 1980).*

*Primary Examiner* — Michael Andrews
(74) *Attorney, Agent, or Firm* — Henry M. Feiereisen LLC

(57) ABSTRACT

A slot-closing device for closing a slot in a stator or a rotor of an electric machine includes a closure element for closing the slot. A closure element for closing the slot contains a ferromagnetic material, and has a predetermined bending section along a longitudinal extension direction of the closure element, such that two leg portions disposed at an obtuse angle of less than 180° to one another are connected by the bending section. An adhesive layer designed to harden when heated is disposed on edges of the two leg portions.

30 Claims, 3 Drawing Sheets

(58) Field of Classification Search
USPC .................................................. 310/214, 215
See application file for complete search history.

(56) References Cited

U.S. PATENT DOCUMENTS

| | | |
|---|---|---|
| 2016/0156241 A1 | 6/2016 | Grübel et al. |
| 2016/0285337 A1 | 9/2016 | Huber et al. |
| 2016/0285338 A1 | 9/2016 | Huber et al. |

FOREIGN PATENT DOCUMENTS

| | | | | |
|---|---|---|---|---|
| DE | 324737 C | 9/1920 | | |
| DE | 15 38 935 A1 | 5/1970 | | |
| EP | 2453549 A1 | 5/2012 | | |
| EP | 2 706 649 A1 | 3/2014 | | |
| GB | 191423868 A | 6/1915 | | |
| JP | 55029242 A | * | 3/1980 | ............ H02K 3/493 |
| JP | S61 247256 A | 11/1986 | | |
| JP | H05211739 A | 8/1993 | | |
| SU | 417873 A1 | 2/1974 | | |

* cited by examiner

EXPANDABLE SLOT CLOSURE FOR AN ELECTRIC MACHINE

CROSS-REFERENCES TO RELATED APPLICATIONS

This application is the U.S. National Stage of International Application No. PCT/EP20161052670, filed Feb. 9, 2016, which designated the United States and has been published as International Publication No. WO 2016/150610 A1 and which claims the priority of European Patent Application, Serial No. 15161108.4, filed Mar. 26, 2015, pursuant to 35 U.S.C. 119(a)-(d).

BACKGROUND OF THE INVENTION

The invention relates to a slot-closing device for closing a slot in a stator or rotor of an electric machine. The slot-closing device enables electrical conductive elements, for example copper bars, by means of which a three-phase winding is formed, to be fixed or retained in position in the slot. Also included in the invention are a device which can be embodied as a stator or rotor and a method for closing a slot of the stator or rotor.

The slots of electric machines serve to accommodate the insulated electrical conductive elements or, as the case may be, an arrangement of such conductive elements. The slots generally have a slot opening which is directed toward the air gap of the electric machine. The conductive elements can be inserted into the slot by way of the slot opening during the manufacture of the electric machine. In particular in the case of high-voltage machines, the practice is to make use of what are termed open slots, in which the slot opening extends over the entire slot width.

Once the conductive elements have been inserted, the slot opening must be closed in order to prevent the conductive elements from working their way up and out of the slot during the operation of the electric machine. The slot closure is usually achieved by means of solid slot closure elements, known as slot wedges. Said slot wedges may be fabricated for example from technical laminated materials by mechanical processing. Equally, they may be fabricated from thermoplastic or duroplastic molding materials by means of strand extrusion or injection molding.

The slot closure materials can be non-magnetizable composites, which therefore make no effective contribution to the magnetizability of the stator, as a result of which the power factor, efficiency and heat buildup, and consequently resistive losses, can exhibit unfavorable values.

In order to improve the magnetic flux guidance in the region of the slot opening, slot closures can be embodied in part using soft-magnetic materials, for example by means of iron-filled ferritic laminated materials. Such a slot-closing device is known from EP 2 706 649 A1, for example.

A major disadvantage with soft-magnetic slot-closing devices is that on account of the hard material used it is not possible to guarantee the permanent tightness of fit in the slot, because the soft-magnetic material executes a proper motion due to the magnetic alternating loads during the operation of the machine in combination with thermal load, thermomechanical alternating load and environmental influences, as a result of which proper motion the slot-closing device can shake itself loose.

It is known from EP 2 706 649 A1 to mechanically deform a slot wedge in order by this means to spread or expand it in a slot. At the same time an electrically insulating layer can also be sandwiched between the slot wedge and a slot wall. In this case a laborious and time-consuming operation is required in order to fix the insulating layer in place during the expansion of the slot wedge.

SUMMARY OF THE INVENTION

The object underlying the invention is to close a slot of an electric machine in the minimum possible time.

The object is achieved by means of the subject matter of the respective independent claims. Advantageous developments of the invention are revealed by the features of the dependent claims.

The invention comprises a slot-closing device for closing a slot in a stator or rotor of an electric machine. A rotor of a linear motor or a rotor of a rotary machine may be provided as the rotor, for example. The slot-closing device comprises a closure element that contains a ferromagnetic material, e.g. iron. In addition, the closure element has a predetermined bending section which extends along a longitudinal extension direction of the closure element and via which two limbs or leg portions that are disposed at an obtuse angle of less than 180° to one another are connected. In other words, the closure element includes a bend along its length. The slot-closing device can then be inserted into a slot of a stator or rotor and expanded therein so that the angle becomes greater. By this means the slot-closing device can be clamped or wedged tightly in the slot.

In the slot-closing device according to the invention, the closure element is preconfigured in such a way that it can be arranged in a slot and fixed in position with little effort. An adhesive layer is disposed in each case on respective edges of the leg portions for this purpose. In other words, the adhesive layer is arranged in each case on an outside edge of the leg portion. The adhesive layer is embodied to harden under the effect of heat. The warming or heating of the adhesive layer causes the adhesive layer to be resoftened or liquefied. The adhesive layer is subsequently crosslinked or polymerized and hardens into a non-resoftenable form. The adhesive agent for the adhesive layer can be based on a duroplast, for example, in particular an epoxy or an epoxy derivative. A plurality of adhesive layers of the type described may also be disposed on the closure element.

Also part of the invention are developments by means of which additional advantages are produced.

According to a development, the adhesive layer contains an adhesive agent based on a reaction resin in the B stage. In other words, the adhesive agent is in a partially cured state. This yields the advantage that the adhesive agent of the adhesive layer is self-adhering, i.e. does not flow down or off from the closure element.

According to a development, the resoftening temperature of the B stage is set to a value in a range from 50° C. to 250° C., preferably from 50° C. to 150° C., in particular from 70° C. to 120° C. A resoftening temperature above 50° C., for example 70° C., has the advantage that an unintentional softening of the adhesive agent, for example during a transportation of the slot-closing device to a factory for electric machines, is avoided. The setting of the resoftening temperature can be achieved by appropriate choice of a reaction resin.

According to a development, a cross-section of the closure element is embodied as narrower in the predetermined bending section by comparison with the leg portions. This advantageously produces a predetermined bending point.

According to a development, the edges of the leg portions are embodied as rounded or radiused. In other words, the edges have a rounded cross-sectional profile. A radius of the respective rounding is in particular greater than 0.5 cm. The rounding avoids the possibility of the closure element becoming wedged in the slot as it spreads out. In other words, the rounded edges form a ball-shaped head of a ball joint. By this means a correct guidance and alignment are ensured during the mechanical deformation of the closure element.

According to a development, the adhesive layer contains a granulate or powder. These are formed by an electrically insulating filler. An average particle size of the granulate and/or powder can lie in a range from 5 nanometers to 50 micrometers. An inorganic or organic material can be provided as the filler. By providing the electrically insulating filler composed of a solid particulate material there is yielded the advantage that the closure element made of ferromagnetic material, after being arranged and expanded in the slot, is still disposed spaced at a distance from the slot wall, i.e. from the lamination stack of the stator or rotor. This prevents the formation of a current path that runs between the closure element on the one hand and the lamination stack on the other hand. This avoids losses due to induction currents.

The filler has a monomodal particle size distribution according to one development, and a multimodal particle size distribution according to another development. A monomodal particle size distribution has the advantage that during its expansion the closure element rolls with little resistance over the individual granulate or powder particles. A multimodal particle size distribution has the advantage that even if the large particles fracture there still remain smaller particles over which the closure element can roll.

According to a development, inorganic powdery solid particulate materials, such as e.g. quartz powder, talcum powder or other metal oxides, are provided as fillers. These can be combined in a reaction-free manner with the described types of adhesive agent in order to achieve the described advantages. According to a development, organic solid particulate materials, such as e.g. polymer microspheres, are provided as fillers.

According to a development, the closure element, for example the slot wedge, has ferromagnetic sheet-metal lamination layers that are electrically insulated from one another. A respective extension plane of each sheet-metal lamination layer is oriented perpendicularly to a longitudinal extension direction of the closure element. In other words, after being arranged in a stator lamination stack or rotor lamination stack, the sheet-metal lamination layers of the closure element are aligned so as to be coplanar with or parallel to the sheet-metal laminations of the lamination stack of the stator or rotor. This yields the advantage that no eddy currents can be induced even in the closure element during the operation of the electric machine.

According to a development, a value of the obtuse angle is set such that an adhesive agent contained in the closure element nonetheless remains undamaged when the slot-closing device is expanded by increasing the angle. In other words, the deformation path when the closure element is expanded is limited such that a failure or fracturing of the adhesive agent is avoided. The adhesive agent can be e.g. a coating known as bonding varnish for adhesively bonding and electrically insulating the said sheet-metal lamination layers.

The slot-closing device can be provided independently of a rotor or stator, i.e. it is embodied as a supplier part for the manufacture of a stator or rotor. After a slot-closing device according to the invention has been installed in a stator or rotor, a device also included in the invention is produced, which device is embodied as a stator or rotor for an electric machine, wherein electrical conductive elements of a three-phase winding are disposed in at least one slot of the device and the slot is closed by means of a slot wedge according to an embodiment variant of the invention. As a rotor, the device can be embodied in the described manner as a rotor or as an armature of a linear motor.

Also included in the invention is a method for closing a slot of a stator or rotor of an electric machine. An embodiment variant of the slot-closing device according to the invention is provided and the same is disposed in the slot. A force is applied to the slot-closing device, which force is able to act e.g. on the predetermined bending section. The force can be directed toward a slot floor of the slot. By means of the force, the closure element is expanded in the slot as a result of a plastic deformation. During this process the closure element can be supported on ridges or steps in slot walls of the slot. The ridges or steps can in each case be formed by an undercut or a slot or recess in one of the slot walls in each case.

The adhesive layer of the slot-closing device is then heated so that the adhesive layer undergoes a chemical reaction and hardens into a non-resoftenable form.

According to a development, a dimension of the slot-closing device is chosen such that a cross-section of the slot-closing device including the adhesive layer is smaller than a corresponding slot cross-section of the slot. This prevents the adhesive layer from being stripped off against a slot wall of the slot when the slot-closing device is inserted into the slot along an axial direction of the rotor or stator.

According to a development, the closure element disposed in the slot is arranged contactlessly in the slot in relation to slot walls of the slot. This yields the advantage that the slot walls are electrically insulated with respect to the closure element. This prevents the formation of a current path between the lamination stack of the stator or rotor on the one hand and the closure element on the other hand. As a result there can be no induction of an eddy current that flows between the closure element on the one hand and the lamination stack on the other hand.

According to a development, the heating of the adhesive layer is effected by thermal treatment in a convection oven and/or by inductive heating of the closure element of the slot-closing device and/or of the stator/rotor. Applying heat to the closure element and/or to the lamination stack of the stator/rotor yields the advantage that the heat is uniformly distributed and as a result the adhesive layer can be fully transitioned into the hardened state.

According to a development, the closure element is manufactured from pieces of sheet metal that were produced during the die stamping of slot cross-sections in metal sheets for a lamination stack of the electric machine. This yields the advantage that the scrapping or wastage of sheet metal during the manufacture of the electric machine is reduced.

Also included in the invention are developments of the inventive method which have features that have already been described in connection with developments of the inventive slot-closing device. For this reason corresponding developments of the inventive method are not described again here.

BRIEF DESCRIPTION OF THE DRAWING

An exemplary embodiment of the invention is described below. In the figures.

DETAILED DESCRIPTION OF PREFERRED EMBODIMENTS

The exemplary embodiment explained hereinbelow is a preferred embodiment variant of the invention. In the exemplary embodiment, the described components of the embodiment variant in each case represent individual features of the invention which are to be considered independently of one another and which in each case also develop the invention independently of one another and consequently are also to be regarded as part of the invention either individually or in a different combination from that shown. Furthermore, the described embodiment variant can also be supplemented by further of the already described features of the invention.

In the figures, functionally identical elements are in each case labeled with the same reference signs.

Figure 1:
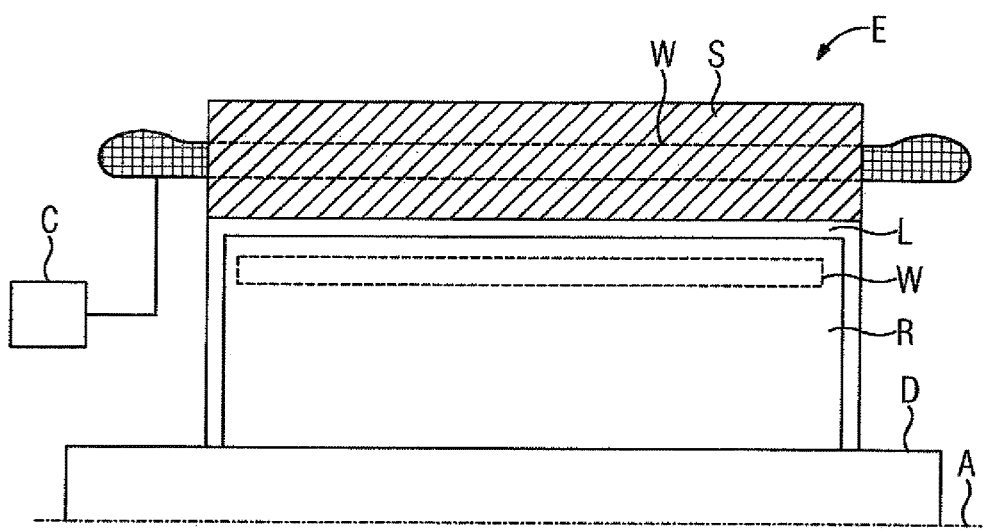
FIG. 1 shows a schematic view of an electric machine comprising an embodiment variant of the device according to the invention.

FIG. 1 shows a longitudinal section through an electric machine E, which may be a synchronous machine or an asynchronous machine, for example. In FIG. 1, an axis of rotation A also represents an axis of symmetry of the illustration. The electric machine E comprises a stator S in which windings W of electrical coils are disposed, only one of the windings W being shown in FIG. 1. The windings W can be formed from conductive elements, e.g. wires or bars. The windings W are energized alternately by means of a three-phase current source C, as a result of which a rotating magnetic field is generated in the interior of the stator S in an air gap L of the electric machine E. The three-phase current source C can be an inverter, for example, or a fixed-frequency electricity supply network.

Located in the interior of the stator S is a rotor R, which is connected to a shaft D for co-rotation therewith. The shaft D is mounted in the stator S so as to be rotatable about the axis of rotation A. Windings W composed of conductive elements may likewise be disposed in the rotor R.

The rotor R and/or the stator S can in each case be an embodiment variant of the device according to the invention.

Figure 2:
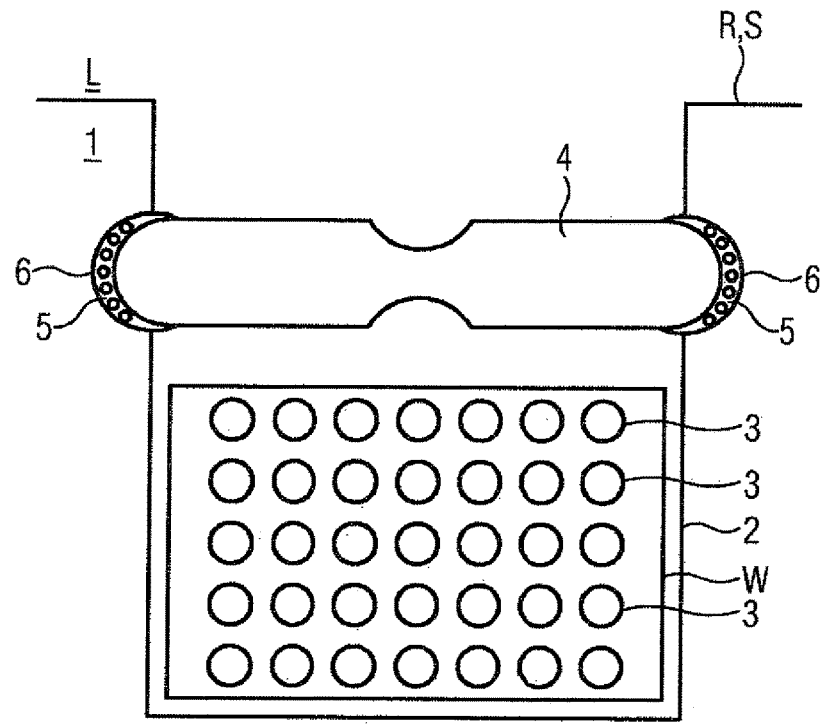
FIG. 2 shows a schematic view of a slot that may be found in a stator or rotor of the electric machine from FIG. 1.

FIG. 2 shows a detail from a cross-section, which can be a cross-section of the stator S or of the rotor R. Slots 2 can be provided in a lamination stack 1 of the stator or rotor, only one of which slots is shown in FIG. 2 for clarity of illustration reasons. A longitudinal extension direction of the slot 2 is aligned parallel to the axis of rotation A. It is oriented perpendicularly to the drawing plane of FIG. 2.

One of the windings W can be disposed in the slot 2, i.e. conductive elements 3 of the winding W extend in the slot 2 in the axial direction. For clarity of illustration reasons, only some of the conductive elements 3 are labeled with a reference numeral in FIG. 2. The slot 2 is closed off toward the air gap L by means of a closure element 4 which is retained in an undercut 6 of the slot 5 by means of a hardened adhesive layer 5. The adhesive layer 5 is sufficiently thick to secure the closure element 4 in the undercut 6 in a play-free manner. It was nonetheless possible to insert the closure element 4 into the slot 2 together with the not yet hardened adhesive layer 5 in a single operating step, the closure element 4 having been inserted into the slot together with the adhesive layer 5 in the axial direction from an axial end of the lamination stack 1 along a longitudinal extension direction of the undercut 6.

Figure 3:
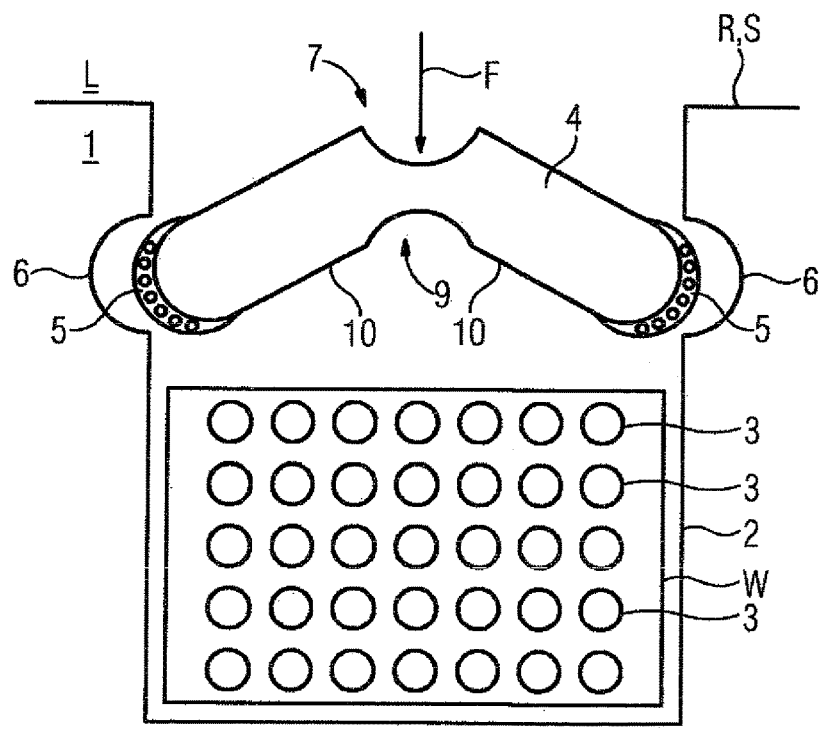
FIG. 3 shows a schematic view of a slot-closing device by means of which the slot from FIG. 2 is in the process of being closed.
Figure 4:
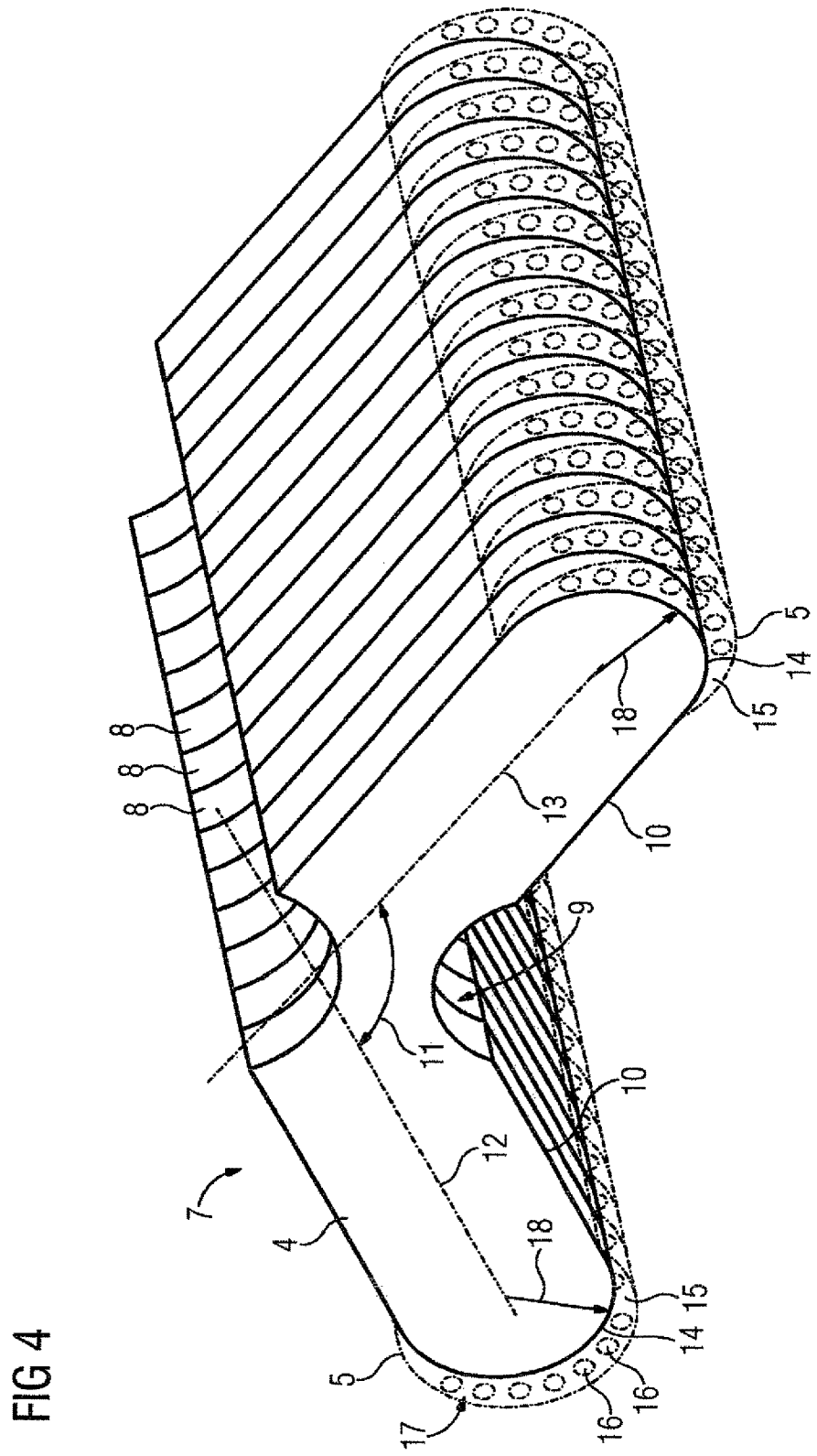
FIG. 4 shows a schematic view of the slot-closing device from FIG. 3 in the as-supplied condition.

For this purpose, the closure element 4 was provided together with the adhesive layer 5 as a slot-closing device 7, as is illustrated in FIG. 3 and FIG. 4. The closure element 4 can be produced by stacking ferromagnetic sheet-metal lamination layers 8 together or on top of one another, which layers are electrically insulated from one another, and applying heat thereto. For clarity of illustration reasons, only some of the sheet-metal lamination layers 8 are labeled with a reference numeral in FIG. 4. The insulation and adhesive bonding of the sheet-metal lamination layers can be accomplished by means of a coating known as bonding varnish. This is known per se from the manufacture of lamination stacks such as the lamination stack 1. The adhesive layer 5 is disposed on the closure element 4, an adhesive agent of the adhesive layer 5 being in a B stage, that is to say in a partially polymerized state. As a result the adhesive layer 5 continues to adhere to the closure element 4 and for example does not drip off from the closure element 4. The closure element 4 can be inserted into the undercut 6 in the axial direction in the described manner.

In order to enable the slot-closing device 7 to be inserted into the skit 2 in a collision-free manner, the closure element 4 is embodied to flex along its longitudinal direction, i.e. when being inserted in the axial direction. To that end, the closure element 4 has a predetermined bending section 9 via which two leg portions 10 are connected. In the predetermined bending section 9, the closure element has a narrower cross-section, as the same is depicted in FIG. 2, FIG. 3 and FIG. 4. In other words, the closure element 4 is thinner in the predetermined bending section 9 than in the leg portions 10. Owing to the bend in the predetermined bending section 9, the leg portions 10 are disposed at an angle 11 to one another, which forms an obtuse angle that is smaller than 180°. In other words, longitudinal axes 12, 13 of the leg portions 10, as are produced in the cross-sectional profile, are aligned relative to one another at the angle 11. The bend causes the closure element 4 to have an arch-like structure.

After the slot-closing device 7 has been inserted into the slot 2, ends 14 of the leg portions 10 project into an undercut 6 in each case. The adhesive layer 5 is disposed at each of the ends 14.

Filler elements 16 of a filler 17 can be arranged in an adhesive agent 15 of the adhesive layer 5. The filler elements 16 are electrically insulating. The filler elements 16 can be, for example, particles of a granulate or powder, e.g. of a quartz sand or a quartz powder. As shown in FIG. 2, the effect of the filler 17 is to keep the closure element 4 spaced apart by a clearance from slot walls of the slot 2 in the region of the undercut 6.

Applying a force F to the closure element 4 in the direction of the slot floor causes the closure element 4 to spread out. In other words, the predetermined bending section is plastically deformed. This causes the angle 11 to increase in size until the closure element 4 assumes the shape shown in FIG. 2 and as a result, in conjunction with the undercut 6, forms a positive-locking fit by means of which a movement of the closure element 4 in the direction toward the air gap L is inhibited. Furthermore, the closure element 4 lodges in the slot in such a way that it is also fixed in position in the axial direction. The angle 11 is chosen such that during the mechanical deformation of the closure element 4 the deformation path or deformation length is limited in order to prevent the adhesive layer from shearing through and consequently to avoid the short-circuiting of the sheet-metal lamination layers 8.

The filler 17 also simplifies or facilitates the sliding or rolling of the ends 14 on the surface of the undercut 6. A further simplification of the expansion action is produced as a result of the ends 14 being rounded. A radius 18 of the roundings of the ends 14 is in particular greater than 0.5 cm. The slot walls can likewise have a rounding in the region of the undercut 6. A radius of these roundings is in particular equal to or greater than the radius 18 of the roundings of the ends 14. The rounded contours of the lateral limbs of the slot wedge and the side faces of the lamination stack slot result in a ball joint, thereby ensuring the correct guidance and alignment during the mechanical deformation of the closure element. The deformation causes the lateral limbs to be exactly fitted to the slot geometry. In this case the adhesive agent serves as an additional fixing means, though it acts primarily as an insulator of the slot wedge with respect to the lamination stack of the electric machine.

The adhesive layer can subsequently be heated.

A size of a cross-section of the slot closure element 7 is matched to the lamination stack, in particular to a slot width of the slot 2 in the region of the undercut 6. The undercut 6 forms a track for the closure element. When the slot closure element 7 is inserted, adhesive agent can be stripped off during the insertion due to the lamination stack misalignment of individual electric sheets of the lamination stack 1, as a result of which the necessary adhesive bonding of the closure element over its surface would not be guaranteed. A dimension of the slot closure element is therefore chosen to be sufficiently small that the slot closure element 7 including its adhesive layer 5 is narrower or has a smaller dimension than the slot 2 in the region of the undercut 6. This allows the slot-closing device 7 to be inserted into the slot 2 without adhesive agent being stripped off. Because the closure element 4 is expanded and the adhesive layer 5 maintains the hardened state 15 after cooling down, the closure element 4 is nonetheless tightly seated in the slot.

After the slot-closing device 7 is inserted into the slot, the slot-closing device 7 can be fixed in position at the axial lamination stack ends by means of non-magnetic slot closure wedges in order to secure it temporarily until the closure element 4 has expanded and the adhesive layer 5 has hardened. The polymerization of the adhesive layer 5 can be effected or achieved through heat treatment in the convection oven or by inductive heating of the slot-closing device 7.

A simple application process for solid magnetic slot closure wedges, i.e. closure elements, in an electric machine is produced by providing a closure element 4 preconfigured with an adhesive layer 5, that is to say by providing the slot-closing device 7. The complete attachment of the slot wedge across both the axial and the radial lamination stack dimension is ensured. It is even possible to achieve an improvement in the tightness of fit. At the same time the number of process steps is minimized, because no additional gluing application is necessary.

The layered arrangement of the closure element 4 results in an increase in magnetic utilization at the same time as increased thermal and mechanical robustness through use of the layered bonding-varnish-coated sheet-metal laminations. Because use is made of those sheet-metal parts which are produced when a profile of the slot 2 is stamped out in the individual sheet-metal laminations of the lamination stack 1 in order to provide the sheet-metal lamination layers 8, a virtually complete utilization of the lamination stack blanks can be realized.

All in all, the example shows how a plastically deformable, glued-in magnetic slot closure can be provided by means of the invention.

The invention claimed is:

1. A slot-closing device for closing a slot in a stator or a rotor of an electric machine, said slot-closing device comprising:
    a closure element containing a ferromagnetic material and including two leg portions disposed at an obtuse angle of less than 180' to one another and a predetermined bending section extending along a longitudinal extension direction of the closure element and connecting the two leg portions; and
    an adhesive layer disposed on respective edges of the two leg portions, said adhesive layer being configured to harden when heated.

2. The slot-closing device of claim 1, wherein the closure element has a cross-section which is narrower in the predetermined bending section than in the two leg portions.

3. The slot-closing device of claim 1, wherein the edges have a rounded cross-sectional profile.

4. The slot-closing device of claim 3, wherein the rounded cross-sectional profile is defined by a radius which is greater than 0.5 centimeters.

5. The slot-closing device of claim 1, wherein the adhesive layer contains a granulate and/or a powder composed of an electrically insulating filler.

6. The slot-closing device of claim 5, wherein the filler has a monomodal or multimodal particle size distribution.

7. The slot-closing device of claim 5, wherein the filler contains quartz sand.

8. The slot-closing device of claim 1, wherein the adhesive layer contains an adhesive agent based on a reaction resin in a B stage.

9. The slot-closing device of claim 8, wherein a resoftening temperature of the B stage has a value in a range from 50° C. to 250° C.

10. The slot-closing device of claim 9, wherein the resoftening temperature of the B stage has a value in a range from 50° C. to 150° C.

11. The slot-closing device of claim 9, wherein the resoftening temperature of the B stage has a value in a range from from 70° C. to 120° C.

12. The slot-closing device of claim 1, wherein a value of the obtuse angle is set such that an adhesive agent contained on the closure element remains undamaged when the slot-closing device is expanded by increasing the angle.

13. The slot-closing device of claim 1, wherein the closure element has ferromagnetic sheet-metal lamination layers that are electrically insulated from one another, each said lamination layer defining an extension plane oriented perpendicularly to the longitudinal extension direction of the closure element.

14. A device embodied as a stator or a rotor for an electric machine, said device comprising:
    a three-phase winding formed by electrical conductive elements for arrangement in a slot of the device; and
    a closure element for closing the slot, said closure element containing a ferromagnetic material and including two leg portions disposed at an obtuse angle of less than 180° to one another, a predetermined bending section extending along a longitudinal extension direction of the closure element and connecting the two leg portions, and an adhesive layer disposed on respective edges of the two leg portions, said adhesive layer being configured to expand and harden when heated.

15. The device of claim 14, wherein the closure element has a cross-section which is narrower in the predetermined bending section than in the two leg portions.

16. The device of claim 14, wherein the edges have a rounded cross-sectional profile.

17. The device of claim 16, wherein the rounded cross-sectional profile is defined by a radius which is greater than 0.5 centimeters.

18. The device of claim 14, wherein the adhesive layer contains a granulate and/or a powder composed of an electrically insulating filler.

19. The device of claim 18, wherein the filler has a monomodal or multimodal particle size distribution.

20. The device of claim 18, wherein the filler contains quartz sand.

21. The device of claim 14, wherein the adhesive layer contains an adhesive agent based on a reaction resin in a B stage.

22. The device of claim 21, wherein a resoftening temperature of the B stage has a value in a range from 50° C. to 250° C.

23. The device of claim 22, wherein the resoftening temperature of the B stage has a value in a range from 50° C. to 150° C.

24. The device of claim 22, wherein the resoftening temperature of the B stage has a value in a range from 70° C. to 120° C.

25. The device of claim 14, wherein a value of the obtuse angle is set such that an adhesive agent contained on the closure element remains undamaged when the slot-closing device is expanded by increasing the angle.

26. The device of claim 14, wherein the closure element has ferromagnetic sheet-metal lamination layers that are electrically insulated from one another, each said lamination layer defining an extension plane oriented perpendicularly to the longitudinal extension direction of the closure element.

27. A method for closing a slot in a stator or a rotor of an electric machine, said method comprising:
disposing in the slot a slot-closing device having a closure element containing a ferromagnetic material and including two leg portions disposed at an obtuse angle of less than 180° to one another, a predetermined bending section extending along a longitudinal extension direction of the closure element and connecting the two leg portions, and an adhesive layer disposed on respective edges of the two leg portions and configured to harden when heated;
applying a force to the slot-closing device to thereby expand the the slot-closing device in the slot as a result of a plastic deformation;
heating the adhesive layer of the slot-closing device until the adhesive layer polymerizes; and
cooling down the adhesive layer.

28. The method of claim 27, further comprising selecting a dimension of the slot-closing device, such that a cross-section of the slot-closing device including the adhesive layer is smaller than a cross-section of the slot.

29. The method of claim 27, wherein the heating of the adhesive layer is effected by thermal treatment in a convection oven and/or by inductive heating of the closure element of the slot-closing device and/or of the stator and the rotor.

30. The method of claim 27, further comprising manufacturing the closure element from pieces of sheet metal, produced during die stamping of slot cross-sections in metal sheets for a lamination stack of the electric machine.

* * * * *